US012784081B2

(12) United States Patent
Rahme et al.

(10) Patent No.: US 12,784,081 B2
(45) Date of Patent: Nov. 3, 2026

(54) METHOD AND SYSTEM FOR AUTOMATING LIEN DISPUTE WORKFLOWS FOR MEDICAL ENTITIES WITH MACHINE LEARNING GENERATED RESOLUTIONS

(71) Applicant: Authentic, Inc., Bingham Farms, MI (US)

(72) Inventors: Kamil Rahme, Scottsdale, AZ (US); Lauren Brown, Winnetka, IL (US)

(73) Assignee: Authentic, Inc., Bingham Farms, MI (US)

( * ) Notice: Subject to any disclaimer, the term of this patent is extended or adjusted under 35 U.S.C. 154(b) by 222 days.

(21) Appl. No.: 18/242,936

(22) Filed: Sep. 6, 2023

(65) Prior Publication Data

US 2025/0078125 A1 Mar. 6, 2025

(51) Int. Cl.

*G06Q 30/04* (2012.01)
*G06Q 50/18* (2012.01)
*G06Q 50/22* (2024.01)

(52) U.S. Cl.

CPC ........... *G06Q 30/04* (2013.01); *G06Q 50/188* (2013.01); *G06Q 50/22* (2013.01)

(58) Field of Classification Search

CPC ...... G06Q 30/04; G06Q 50/188; G06Q 50/22; G06Q 10/10; G06Q 50/18

See application file for complete search history.

(56) References Cited

U.S. PATENT DOCUMENTS 6,587,867 B1 7/2003 Miller
7,685,417 B2 3/2010 Wise et al.
8,069,058 B2 * 11/2011 Ambrose ............... G06Q 30/04 705/2
8,706,877 B2 4/2014 Sundarrajan et al.
10,848,534 B2 11/2020 Namboodiri et al.
11,582,065 B2 2/2023 Burd et al.
2002/0019751 A1 2/2002 Rothschild
2003/0046587 A1 3/2003 Bheemarasetti et al.

(Continued)

OTHER PUBLICATIONS

International Search Report and Written Opinion regarding corresponding PCT App. No. PCT/US22/43152; issued Jan. 3, 2023.

*Primary Examiner* — Aaron Tutor

(74) *Attorney, Agent, or Firm* — DICKINSON WRIGHT PLLC

(57) ABSTRACT

Systems and methods including generating, by a legal entity, via a lien reduction interface, a request to decrease a lien amount for a patient. In addition, the systems and methods may include receiving, by a medical entity, the request to decrease the lien amount. The systems and methods may include reviewing, by a user associated with the medical entity, via a lien resolution interface, the request to decrease the lien amount. Moreover, the systems and methods may include calculating, based on one or more resolved lien reductions associated with the legal entity, via a medical billing database, a predicted lien resolution dataset. Also, the systems and methods may include displaying, based on the predicted lien resolution dataset, via the lien resolution interface, a lien reduction response. Further, the systems and methods may include sending, by the user associated with the medical entity, to the legal entity, the lien reduction response.

14 Claims, 6 Drawing Sheets

(56) References Cited

U.S. PATENT DOCUMENTS

| | | | | |
|---|---|---|---|---|
| 2011/0015941 | A1 | 1/2011 | Backhause | |
| 2015/0178449 | A1 | 6/2015 | Ferry | |
| 2016/0277374 | A1 | 9/2016 | Reid et al. | |
| 2016/0314458 | A1 | 10/2016 | Douglas et al. | |
| 2018/0322946 | A1 | 11/2018 | Ika et al. | |
| 2020/0137097 | A1 | 4/2020 | Zimmerman et al. | |
| 2021/0256615 | A1 | 8/2021 | Hayward et al. | |
| 2021/0295448 | A1 | 9/2021 | McClain et al. | |
| 2022/0214916 | A1 | 7/2022 | Mundra et al. | |
| 2022/0309592 | A1* | 9/2022 | Zahora | G06Q 10/10 |
| 2023/0206367 | A1* | 6/2023 | Nelson | G06Q 50/18<br>705/309 |
| 2023/0252188 | A1 | 8/2023 | Apsingekar et al. | |

* cited by examiner

METHOD AND SYSTEM FOR AUTOMATING LIEN DISPUTE WORKFLOWS FOR MEDICAL ENTITIES WITH MACHINE LEARNING GENERATED RESOLUTIONS

FIELD OF THE DISCLOSURE

The present disclosure relates to automating a lien dispute workflow, specifically by integrating machine learning generated resolution suggestions.

BACKGROUND OF THE DISCLOSURE

This section provides background information related to the present disclosure which is not necessarily prior art.

Hospitals have attempted to utilize physical storage as a means of communication. Such means include a CD-ROM, portable memory devices, and physical mail. In this instance, relevant data is loaded on the device and delivered to another healthcare entity. However, this approach is very time consuming and dependent on mail services.

In order to set up a secure exchange between two healthcare providers and non-healthcare entities, the process often depends on proprietary hardware being transferred from one provider to the other. If hardware is not required, then personnel from one entity must install and authenticate the necessary permissions on a client device of the opposing healthcare entity. Both such approaches are typically time and resource intensive in order to create a network connection.

SUMMARY OF THE DISCLOSURE

This section provides a general summary of the disclosure and is not intended to be interpreted as a comprehensive listing of its full scope or of all of its objects, aspects, features and/or advantages.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a method may include generating, by a legal entity, via a lien reduction interface, a request to decrease a lien amount for a patient. The method may also include receiving, by a medical entity, the request to decrease the lien amount. The method may furthermore include reviewing, by a user associated with the medical entity, via a lien resolution interface, the request to decrease the lien amount. The method may in addition include calculating, based on one or more resolved lien reductions associated with the legal entity, via a medical billing database, a predicted lien resolution dataset. The method may moreover include displaying, based on the predicted lien resolution dataset, via the lien resolution interface, a lien reduction response. The method may also include sending, by the user associated with the medical entity, to the legal entity, the lien reduction response. Other embodiments of this aspect include corresponding computer systems, apparatuses, and computer programs recorded on one or more computer storage devices, each configured to perform the actions of the methods.

Implementations may include one or more of the following features. A method where the predicted lien resolution dataset is calculated by: training, based on one or more records of resolved lien reduction requests, a machine learning model; and generating, by the machine learning model, based on the medical entity, the request to decrease the lien amount, and the legal entity, the predicted lien resolution dataset. A method where the request to decrease the lien amount further includes a legal document. A method where the legal document is one of a judgement, subpoena, settlement agreement, and arbitration agreement. A method where the predicted lien resolution dataset is calculated based on resolved lien reduction data obtained from a network of medical entities. A method may include: receiving, from the legal entity, an acceptance based on the lien reduction response; and updating, at the medical billing database, the lien amount associated with the patient. A method may include: receiving, from the legal entity, a rejection based on the lien reduction response associated with an updated request to reduce a lien request; and calculating, based on one or more resolved lien reductions associated with receiving a rejection, an updated predicted lien resolution dataset. Implementations of the described techniques may include hardware, a method or process, or a computer tangible medium.

Other technical features may be readily apparent to one skilled in the art from the following figures, descriptions, and claims.

DRAWINGS

The drawings described herein are for illustrative purposes only of selected embodiments and not all possible implementations thereof such that the drawings are not intended to limit the scope of the present disclosure.

Corresponding reference numerals indicate corresponding parts throughout the several view of the drawings.

DETAILED DESCRIPTION OF THE EXAMPLE EMBODIMENT

Figure 1:
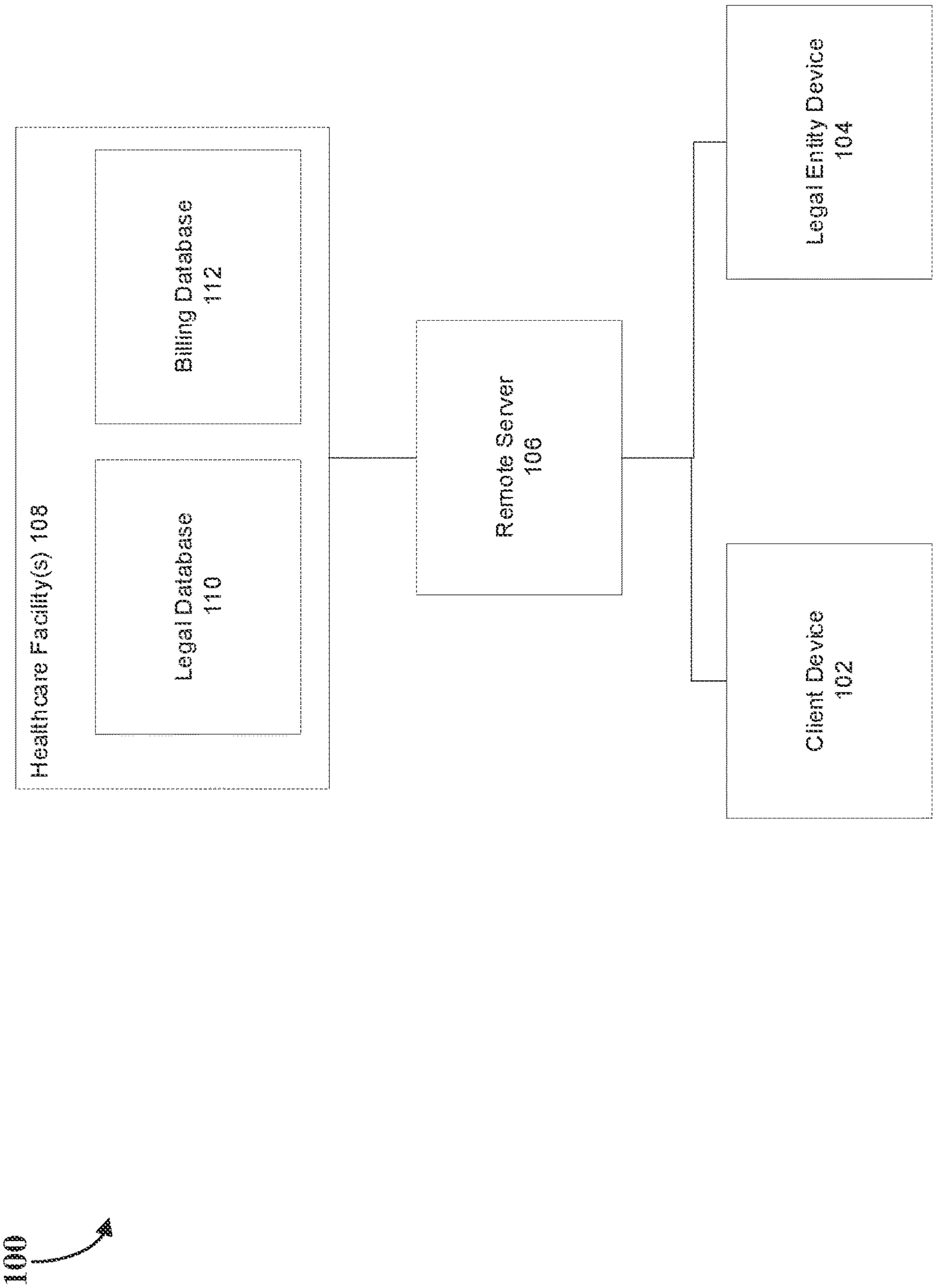
FIG. 1 is a block diagram of an example computing environment, in accordance with the present disclosure.

Example embodiments of an automated lien dispute resolution system embodying the teachings of the present disclosure will now be described more fully with reference to the accompanying drawings. However, the example embodiments are only provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that the example embodiments may be embodied in many different forms that may be combined in various ways, and that neither should be construed to limit the scope of the disclosure. In some example embodiments, well-known processes, well-known device structures, and well-known technologies are not described in detail.

The systems and methods described herein are directed to automating lien dispute resolutions between medical facilities and legal entities.

The systems and methods described herein may be configured to receive from a legal entity, or any interested party associated with a patient of a medical facility, a request for a lien reduction. In some embodiments, the request for a lien reduction may originate from the patient, a legal entity representing the patient, or any party having an interest in the lien.

The systems and methods described herein may present to a person associated with the medical facility to whom the lien is owned, the lien reduction request. In some embodiments, a terminal associated with the medical facility may display to the person the lien reduction request in a standardized interface where metrics related to the lien reduction request are presented in a standardized form. In some embodiments, the metrics related to the lien reduction request may include, but are not limited to: patient name, patient identifying information, original lien amount, requested lien amount, percent difference between the original lien amount and the requested lien amount, date of lien reduction request, the status of the lien reduction request, the medical facility associated with the lien, the legal entity associated with the lien reduction request, documents associated with the lien, and/or any information relevant to the lien reduction request.

The systems and methods described herein may be configured to access databases associated with the medical facility to retrieve further information related to the patient, the legal entity associated with the lien reduction request, and any other information the medical facility may have associated with the lien reduction request. In some embodiments, the additional information may be used to populate a standardized form based on a predicted lien resolution dataset. In some embodiments, the lien resolution dataset may include, but is not limited to the total number of lien reduction requests associated with the medical facility for a given time period (e.g., a month, a quarter, a year, etc.), the total number of open lien reduction requests associated with the medical facility for a given time period, the total number of lien reduction requests associated with the legal entity for a given time period, the total number of open lien reduction requests associated with the legal entity for a given time period, the average reduction requested for a lien reduction requested, the total reduction amount associated with the legal entity, the total reduction amount associated with the medical facility, and/or any other information relevant to the lien reduction request.

The systems and methods described herein may be configured to utilize a machine learning model in order to predict additional information for the lien resolution dataset, including a lien reduction amount which is likely to be accepted by the legal entity and is less than the reduction amount requested in the lien reduction request. In some embodiments, the machine learning model may be trained based on information related to resolved lien reduction requests. In some embodiments, the machine learning model may consider information related to the size of the original lien, the legal entity, the patient, the medical treatment obtained by the patient, the status of the lien, amount of time between the commencement of the lien and the filing of the lien reduction request, and/or any other relevant data. In some embodiments, the machine learning model may weigh more heavily data associated with resolved lien reduction requests that are more recent and from the specific legal entity. In some embodiments, the machine learning model may provide one or more lien reduction counter-offers and provide a confidence score for each lien reduction counter-offer.

The systems and methods described herein may be configured to accept input from the person associated with the medical facility to generate a lien reduction request response. In some embodiments, the lien reduction request may accept from the person an acceptance of the lien reduction request, a refusal of the lien reduction request, and/or a counter-offer to the lien reduction request. In some embodiments, the lien reduction counter-offer may include a lien reduction amount which may be entered by the person associated with the medical facility. In some embodiments, the person may select a counter-offer lien reduction amount based on one or more options generated by the machine learning model.

The systems and methods described herein may be configured to send the response generated by the person associated with medical facility to the legal entity. In some embodiments, the legal entity may accept the counter-offer lien reduction amount. In some embodiments, the acceptance of the counter-offer lien reduction amount may be transmitted to the medical facility and generate a notification for the person associated with the medical facility. In some embodiments, the systems and methods described herein may be configured to update various databases associated with the medical facility based on the acceptance of the lien reduction counter-offer or the acceptance of the lien reduction request. For example, the systems and methods described herein may be configured to update a billing database associated with the medical facility to update the amount owed by the patient associated with the lien reduction request.

In view of the foregoing, a method is desired that allows a healthcare entity to automate a lien dispute workflow with a legal entity where information related to past lien dispute resolutions may be utilized in resolving the lien dispute.

FIG. 1 is a block diagram of an example computing environment 100, in accordance with the systems and methods described herein. The computing environment 100 may include a client device 102 which may be used by the patient to request a lien reduction from a medical facility. The client device 102 may execute the instructions found in a data object which is configured to install system component on the client device 102. The client device 102 may communicate at least one device property to a remote server 106. The remote server 106 may use the received device property in order to determine if the device is already registered to the system in order to authenticate the connection. The client device 102 may be a computer having at least a processor and running an operating system (e.g., MS WINDOWS, APPLE OSX, CHROME OS, ANDROID, LINUX, APPLE iOS). The client device 102 may include a user interface which allows a user to input commands. The user interface may be based on mouse and keyboard inputs, touch based inputs, or any other applicable user interface input method.

The computing environment 100 may include a legal entity device 104, similar to that of client device 102, which may allow a legal entity to request a lien reduction from a medical facility associated with the patient represented by the legal entity. The client device 102 and legal entity device 104 may be connected to the remote server 106 via a network. The remote server 106 may distribute a data object which installs an application program interface (API) on any device in the computing environment 100. The API may allow access to databases of devices in the computing environment 100 and authenticate transfers of medical documents through the network. The remote server 106 may be one or many computing devices connected via a network. In some embodiments, the remote server 106 may operate as an API hosted a computing device associated with the healthcare facility.

The computing environment 100 may further include at least one healthcare facility 108. The healthcare facility 108 may be a single device or many devices connected via a network to facilitate the computing needs of a healthcare facility. The healthcare facility 108 may include a legal database 110. The legal database 110 may store information related to legal actions taken by the medical facility and/or legal actions taken against the medical facility. The legal database 110 may be searchable by a person associated with the medical facility to obtain information related to legal actions taken by the medical facility and documents related to those legal actions. The legal database 110 may be searched based on the parties involved, the representing legal entity, the nature of the legal action, the court related to the legal action, and/or any other appropriate means of identifying a legal action. The legal database 110 may include legal actions related to collecting debts from a patient as well as the documents related to that action, which may include, but are not limited to: a subpoena, a judgement, a settlement agreement, an arbitration agreement, a payment plan agreement, a bankruptcy statement, a foreclosure statement, and/or any document related to recovery of a debt.

The healthcare facility 108 may further include a billing database 112. The billing database 112 may store information related to billing by the medical facility. Billing information may include information related to a medical debt incurred by a patient in exchange for medical treatment(s) performed on the patient. Billing information may include, but is not limited to, amount due, payment methods, procedures performed, identification information of the patient, identification information of staff associated with medical treatment, agreed payment plan, lien amount, history of bills paid, credit score of patient, insurance provider of patient, insurance information of patient, and/or any information applicable to patient billing. The billing database 112 may be searched based on any information identifying the patient, the patient insurer, the status of the amount owed, and/or any information related to the debt. The billing database 112 may keep track of payments received by the patient and calculate new amount owed totals in view of the received payments. In some embodiments, requests for billing records and/or documents made by a patient and or physician can be accessed from the billing database 112 by the API.

Figure 2:
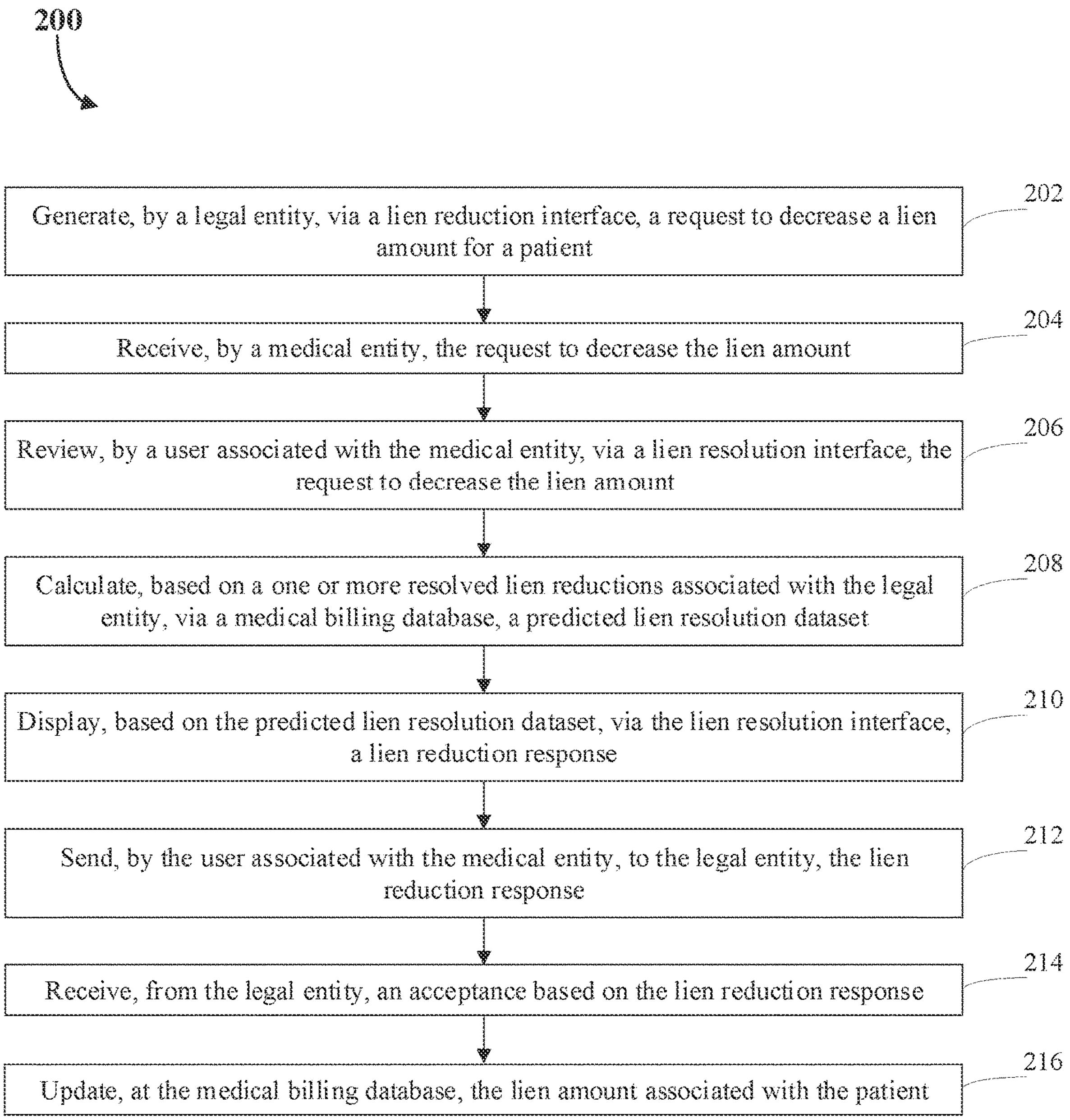
FIG. 2 is a flow chart of a process for automating a lien dispute, according to an example of the present disclosure.

FIG. 2 is a flow chart of a process 200, according to an example of the present disclosure. According to an example, one or more process blocks of FIG. 2 may be performed by a processor 604.

As shown in FIG. 2, process 200 may include generating, by a legal entity, via a lien reduction interface, a request to decrease a lien amount for a patient (block 202). For example, the processor 604 may receive inputs from a patient and/or a legal entity representing the patient in a form having text input boxes. In some embodiments, the text input boxes may include means for accepting information related to a lien reduction request and may include, but is not limited to, patient name, patient identifying information, original lien amount, requested lien amount, percent difference between the original lien amount and the requested lien amount, date of lien reduction request, the status of the lien reduction request, the medical facility associated with the lien, the legal entity associated with the lien reduction request, documents associated with the lien, and/or any information relevant to the lien reduction request. In some embodiments, the processor 604 may communicate the lien reduction request via an API to the healthcare facility 108. In some embodiments, the interface to accept the lien reduction request information may be generated by conforming to requirements received by the API and/or the remote server 106.

As further shown in FIG. 2, process 200 may include receiving, by a medical entity, the request to decrease the lien amount (block 204). For example, the processor 604 may send to the lien reduction request to the healthcare facility 108 via a network. In some embodiments, the processor may send the lien reduction request to the remote server 106 which will send the lien reduction request to the healthcare facility 108. The processor 604 may send the lien reduction request as a data object which may be processed by an API associated with the healthcare facility 108.

As also shown in FIG. 2, process 200 may include reviewing, by a user associated with the medical entity, via a lien resolution interface, the request to decrease the lien amount (block 206). For example, the healthcare facility 108 may be display, based on instruction from the API and/or remote server 106, a user interface with a standardized layout, wherein the information related to the specific lien reduction request is filled out based on the data object sent by the processor 604. The healthcare facility 108 may include a client computing device similar to that of system 600. The client computing device associated with the medical entity may display the interface to the person associated with the medical facility. The person associated with the medical facility may be a representative of the medical facility that is entrusted to determine a lien reduction amount on behalf of the medical entity. In some embodiments, the request for a lien reduction may originate from the patient, a legal entity representing the patient, or any party having an interest in the lien.

In some embodiments, the metrics related to the lien reduction request may include, but are not limited to: patient name, patient identifying information, original lien amount, requested lien amount, percent difference between the original lien amount and the requested lien amount, date of lien reduction request, the status of the lien reduction request, the medical facility associated with the lien, the legal entity associated with the lien reduction request, documents associated with the lien, and/or any information relevant to the lien reduction request.

As further shown in FIG. 2, process 200 may include calculating, based on an one or more resolved lien reductions associated with the legal entity, via a medical billing database, a predicted lien resolution dataset (block 208). For example, the computing device associated with the medical entity may access the legal database 110 and the billing database 112 to retrieve information related to the patient, the legal entity, and the lien associated with the lien reduction request. In some embodiments, the additional information may be used to populate a standardized form based on predicted lien resolution dataset. In some embodiments, the lien resolution dataset may include, but is not limited to the total number of lien reduction requests associated with the medical facility for a given time period (e.g., a month, a quarter, a year, etc.), the total number of open lien reduction requests associated with the medical facility for a given time period, the total number of lien reduction requests associated with the legal entity for a given time period, the total number of open lien reduction requests associated with the legal entity for a given time period, the average reduction requested for a lien reduction requested, the total reduction amount associated with the legal entity, the total reduction amount associated with the medical facility, and/or any other information relevant to the lien reduction request.

As further shown in FIG. 2, process 200 may include displaying, based on the predicted lien resolution dataset, via the lien resolution interface, a lien reduction response (block 210). For example, the computing device associated with the medical entity may display to the person associated with the medical entity a lien reduction response form. In some embodiments, the form may include text fields related to the inputs associated with the lien reduction response such as a counter-offer lien reduction amount. In some embodiments, the lien reduction response may be an approval of the lien reduction amount suggested by the lien reduction request. In some embodiments, the lien reduction response may be disapproval of the lien reduction request. In some embodiments, when the person associated with the medical facility accept the lien reduction request, an notification is sent to the billing database in order to update the amount owed associated to the lien.

As also shown in FIG. 2, process 200 may include sending, by the user associated with the medical entity, to the legal entity, the lien reduction response (block 212). For example, a computing device associated with the healthcare entity may send, by the user associated with the medical entity, to the legal entity, the lien reduction response, as described above.

As also shown in FIG. 2, process 200 may include receiving, from the legal entity, an acceptance based on the lien reduction response (block 214). For example, processor 604 may receive from healthcare facility 108 a lien reduction response having a lien reduction counter-offer amount. The processor 604 may receive input form the legal entity accepting the lien reduction counter-offer amount which resolves the lien reduction dispute. Acceptance of the lien reduction response by the legal entity may be sent to the healthcare facility 108 via the remote server 106.

As also shown in FIG. 2, process 200 may include updating, at the medical billing database, the lien amount associated with the patient (block 216). For example, the healthcare facility 108 may update the legal database 110 and the billing database 112 based on the acceptance of the lien reduction response. Specifically, the billing database 112 may be updated with an updated lien amount. Also the statements (e.g., bills) sent to the patient for requesting payments may be adjusted based on an updated monthly payment amount.

Alternatively, the legal entity may not accept the lien reduction response and the process 200 may include receiving, from the legal entity, a rejection based on the lien reduction response associated with an updated request to reduce a lien request. In some embodiments, the rejection of a lien reduction response ends the lien dispute process. In some embodiments, the rejection of a lien reduction response may initiate another round of lien reduction requests and lien reduction counter-offers.

In response to receiving the rejection, the process 200 may include calculating, based on one or more resolved lien reductions associated with receiving a rejection, an updated predicted lien resolution dataset. In some embodiments, the computing device associated with the healthcare facility 108 may generate an updated lien resolution dataset based on metrics related to lien disputes requiring greater than one round of negotiation. In some embodiments, the metrics displayed may be the same but pulling from lien resolution information based on disputes requiring multiple rounds of negotiation to before an acceptance is reached.

It should be noted that while FIG. 2 shows example blocks of process 200, in some implementations, process 200 may include additional blocks, fewer blocks, different blocks, or differently arranged blocks than those depicted in FIG. 2. Additionally, or alternatively, two or more of the blocks of process 200 may be performed in parallel.

Figure 3:
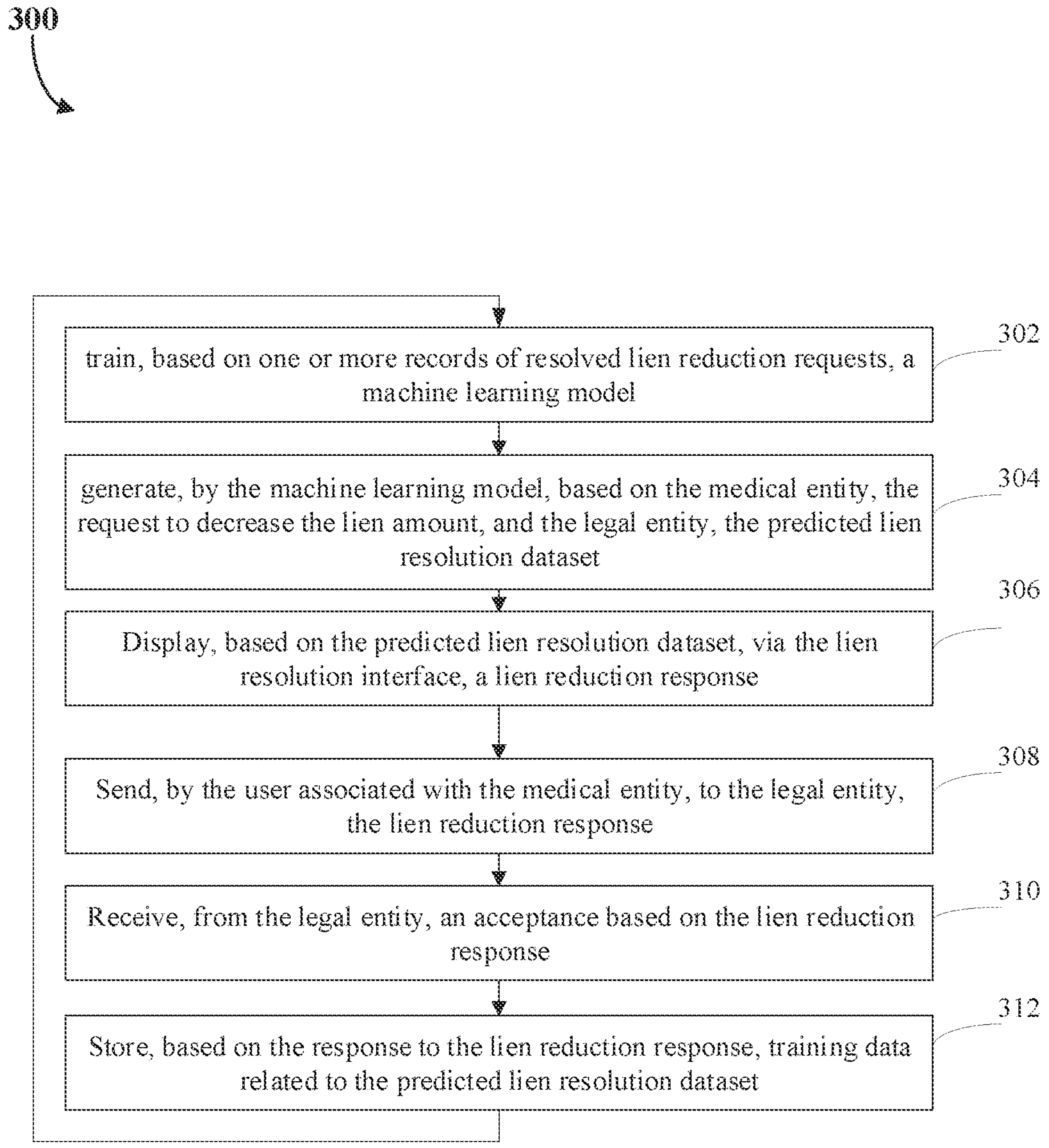
FIG. 3 is a flow chart of generating a lien resolution dataset via machine learning, according to an example of the present disclosure.

FIG. 3 is a flowchart of an example process 300. In some implementations, one or more process blocks of FIG. 3 may be performed by the processor 604.

As shown in FIG. 3, process 300 may include training, based on one or more records of resolved lien reduction requests, a machine learning model (block 302). In some embodiments, the machine learning model may be trained based on information related to resolved lien reduction requests. In some embodiments, the machine learning model may consider information related to the size of the original lien, the legal entity, the patient, the medical treatment obtained by the patient, the status of the lien, amount of time between the commencement of the lien and the filing of the lien reduction request, and/or any other relevant data. In some embodiments, the machine learning model may weigh more heavily data associated with resolved lien reduction requests that are more recent and from the specific legal entity.

As also shown in FIG. 3, process 300 may include generating, by the machine learning model, based on the medical entity, the request to decrease the lien amount, and the legal entity, the predicted lien resolution dataset (block 304). For example, the computing device associated with the medical entity may provide information to the machine learning model by accessing the legal database 110 and the billing database 112 to retrieve information related to the patient, the legal entity, and the lien associated with the lien reduction request. In some embodiments, the additional information may be used to populate a standardized form based on a predicted lien resolution dataset. In some embodiments, the lien resolution dataset may include, but is not limited to the total number of lien reduction requests associated with the medical facility for a given time period (e.g., a month, a quarter, a year, etc.), the total number of open lien reduction requests associated with the medical facility for a given time period, the total number of lien reduction requests associated with the legal entity for a given time period, the total number of open lien reduction requests associated with the legal entity for a given time period, the average reduction requested for a lien reduction requested, the total reduction amount associated with the legal entity, the total reduction amount associated with the medical facility, and/or any other information relevant to the lien reduction request.

As further shown in FIG. 3, process 300 may include displaying, based on the predicted lien resolution dataset, via the lien resolution interface, a lien reduction response (block 306). For example, the machine learning model may provide one or more lien reduction counter-offers and provide a confidence score for each lien reduction counter-offer. The computing device associated with medical entity may provide the person associated with the medical entity the multiple possible lien reduction amounts with the confidence scores of each in order to select a suitable option. In some embodiments, selection of a lien reduction amount option will fill in the lien reduction response interface with the selected lien reduction amount.

As also shown in FIG. 3, process 300 may include sending, by the user associated with the medical entity, to the legal entity, the lien reduction response (block 308). For example, the computing device associated with the health-care entity may send, by the user associated with the medical entity, to the legal entity, the lien reduction response, as described above.

As also shown in FIG. 3, process 300 may include receiving, from the legal entity, an acceptance based on the lien reduction response (block 310). For example, the processor 604 may receive from healthcare facility 108 a lien reduction response having a lien reduction counter-offer amount. The processor 604 may receive input from the legal entity accepting the lien reduction counter-offer amount which resolves the lien reduction dispute. Acceptance of the lien reduction response by the legal entity may be sent to the healthcare facility 108 via the remote server 106.

As further shown in FIG. 3, process 300 may include storing, based on the response to the lien reduction response, training data related to the predicted lien resolution dataset (block 312). In some embodiments, the training data used to train the machine learning model is updated when a lien dispute is resolved. In some embodiments the lien dispute information is stored as a data object related to the instance of the lien dispute. The training data for a data object associated with a lien dispute may include, but is not limited to: length of time required to reach resolution, number of communications required to reach a resolution, the legal entity, the patient, the original lien amount, the requested lien amount, the counter-offer lien amount (if any), the resolved lien amount, the status of the lien repayment, and/or any information related to the lien, the patient, the legal entity, and the lien dispute process.

It should be noted that while FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

Figure 4:
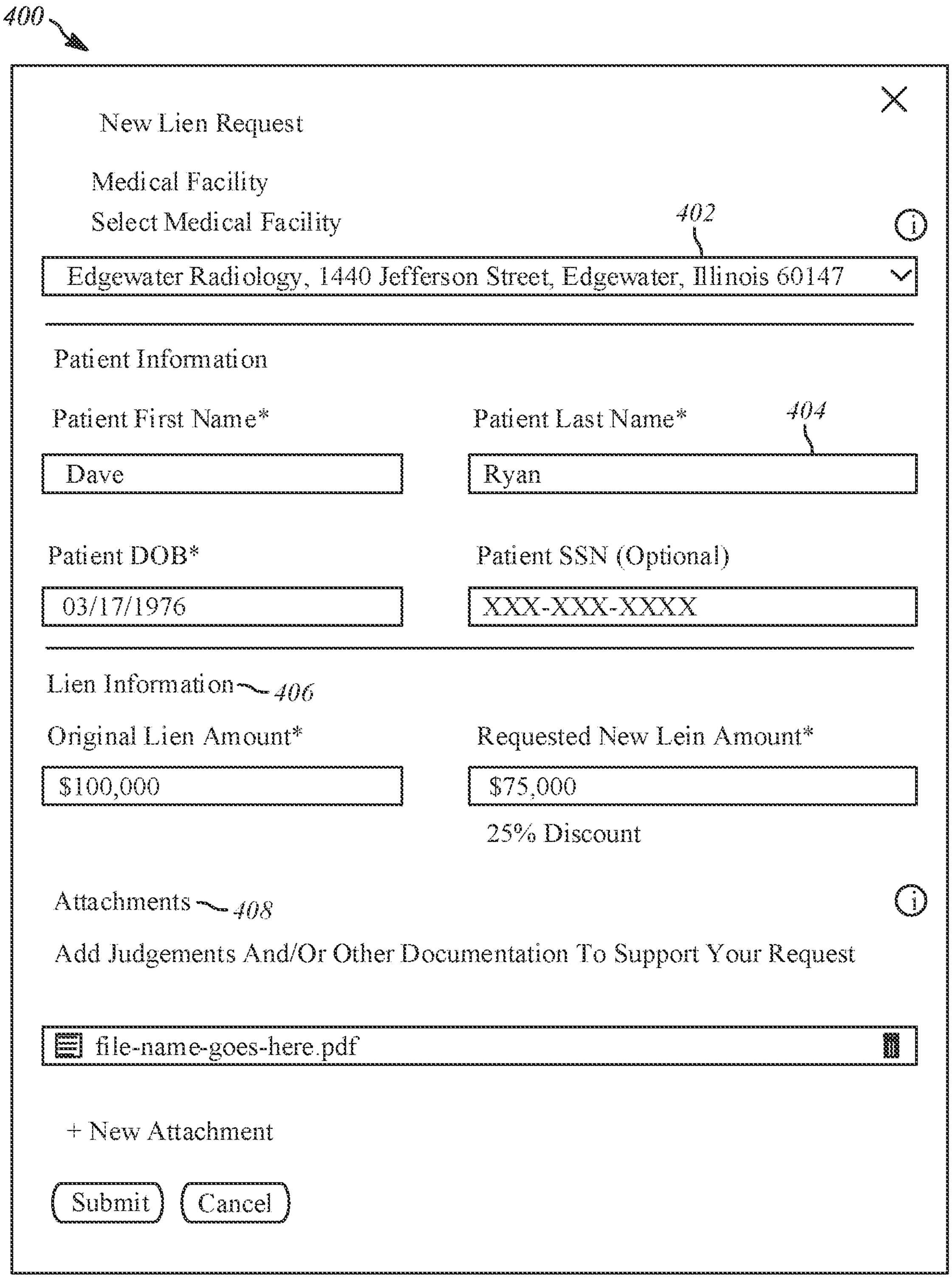
FIG. 4 is an example user interface, according to an example of the present disclosure.

FIG. 4 is an example user interface 400 for generating a lien reduction request, in accordance with the systems and methods described herein. The user interface 400 may be rendered by the processor 604. The user interface 400 may be used to accept input from a legal entity and/or a patient to generate a lien reduction request which is sent to the medical facility.

The user interface 400 may include interface element 402 for selecting a medical facility associated with the lien reduction request. In some embodiments, the interface element 402 may be a drop down list where selection of a down arrow reveals a list of medical facilities stored by the client device 102, the legal entity device 104, and/or the remote server 106. In some embodiments, a new medical facility may be entered by typing into the text box of user interface element 402. In some embodiments, entering a new medical facility will store the medical facility at the client device 102, the legal entity device 104, and/or the remote server 106.

The user interface 400 may include interface element 404 for accepting input related to patient identification information. In some embodiments, the interface element 404 may include multiple text entry boxes for entry of patient identification information. In some embodiments patient identification information may include, but is not limited to, patient first name, patient last name, patient date of birth, patient social security number, patient medical treatment, date of medical treatment, medical facility staff who administered medical care, and/or any patient identification information. In some embodiments, one or more fields of interface element 404 may be not be required for creating the lien reduction request data object.

The user interface 400 may include interface element 406 for accepting input related to lien information. In some embodiments, the interface element 406 may include text input boxes for the lien information. In some embodiments, the lien information may include, but is not limited to, the original lien amount, the requested new lien amount, the date the lien was created, the interest rate of the lien, the number of payment periods of the lien, the installment amounts of the lien, and/or any other information which may be used to define a lien. In some embodiments, one or more fields of interface element 406 may be not be required for creating the lien reduction request data object.

The user interface 400 may include interface element 408 for adding documents in support of the lien reduction request. In some embodiments interface element 408 includes a predefined space where documents may be dragged and dropped in order to initiate an attaching of the documents to the lien reduction request data object. The interface element 408 may further include a button which initiates browsing of the local storage system of the client device 102 and/or the legal entity device 104 in order to select the document to be attached to the lien reduction request data object. In some embodiments, the file name of the document that is attached to the lien reduction request data object may be displayed in the interface element 408.

Figure 5:
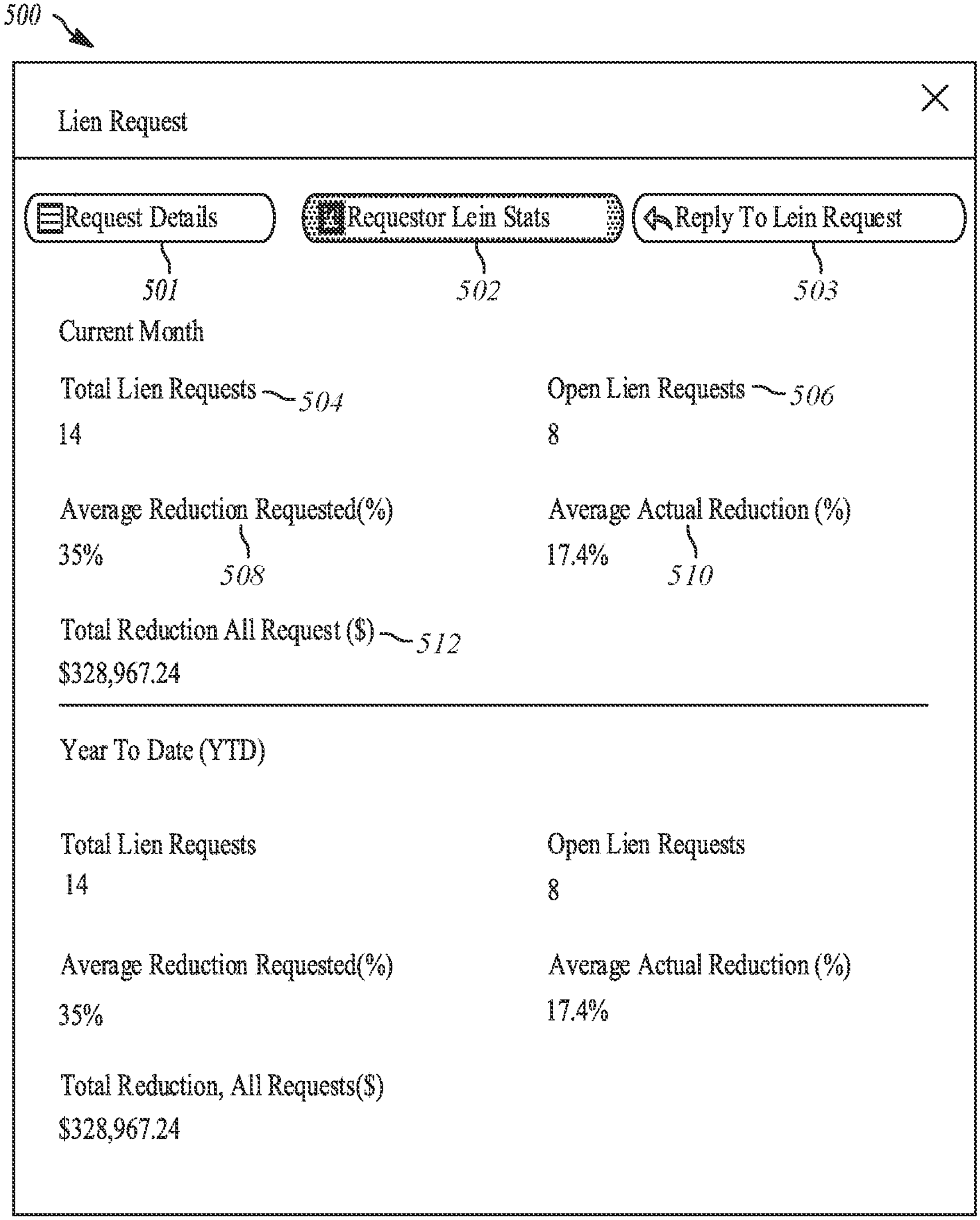
FIG. 5 is an example user interface, according to an example of the present disclosure.

FIG. 5 is an example user interface 500 for viewing lien reduction request details, in accordance with the systems and methods described herein. The user interface 500 may display to a person associated with the medical facility information related to the lien reduction request received from the processor 604.

The user interface 500 may include interface elements 501, 502, and 503 which navigate between three panels of the user interface 500. In some embodiments, the interface element 501 navigates to a panel displaying to the user information related to the lien reduction request. In some embodiments, information related to the lien reduction request may include, but is not limited to, patient name, patient identifying information, original lien amount, requested lien amount, percent difference between the original lien amount and the requested lien amount, date of lien reduction request, the status of the lien reduction request, the medical facility associated with the lien, the legal entity associated with the lien reduction request, documents associated with the lien, and/or any information relevant to the lien reduction request.

The user interface 500 may include an interface element 503, the selection of which displays a panel of user interface 500 which accepts input related to replying to the lien reduction request. In some embodiments, a reply to a lien reduction request may include, but is not limited to, an acceptance of the lien reduction request, a refusal of the lien reduction request, and/or a counter-offer to the lien reduction request. In some embodiments, the user interface 500 may further provide one or more lien reduction counter-offers and provide a confidence score for each lien reduction counter-offer.

The user interface 500 may include an interface element 502 which displays a panel of the user interface 500 related to displaying lien statistics associated with the lien reduction request. In some embodiments, the lien statistics associated with the lien reduction request may include the predicted lien resolution dataset. In some embodiments, the lien resolution dataset may include, but is not limited to the total number of lien reduction requests associated with the medical facility for a given time period (e.g., a month, a quarter, a year, etc.), the total number of open lien reduction requests associated with the medical facility for a given time period, the total number of lien reduction requests associated with the legal entity for a given time period, the total number of open lien reduction requests associated with the legal entity for a given time period, the average reduction requested for a lien reduction requested, the total reduction amount associated with the legal entity, the total reduction amount associated with the medical facility, and/or any other information relevant to the lien reduction request.

In some embodiments, the user interface 500 may include a section for information related to a lien reduction request received by the medical entity during a specific time period and/or from a specific legal entity. In some embodiments, the person associated with the medical facility may customize the user interface 500 based on the time period and legal entity statistics associated with the lien requests associated with the medical entity. In some embodiments, the user interface 500 may include interface element 504 for displaying the total number of lien requests over the course of a time period. In some embodiments, the user interface 500 may include interface element 506 for displaying the total number of unresolved lien requests received by the medical facility over a time period. In some embodiments, the user interface 500 may include interface element 508 for displaying the average reduction request by the legal entity over a time period. In some embodiments, the user interface 500 may include interface element 510 for displaying the actual average reduction in the lien amount based on resolved lien reduction requests over a time period. In some embodiments, the user interface 500 may include interface element 512 for displaying the total reduction requested by the legal entity based on all lien reduction requests received over a time period.

In some embodiments, the user interface 500 may have access to lien data from multiple healthcare facilities and make that data available for view by request of the person associated with the medical facility. In some embodiments, the lien request information may be filtered based on the person associated with the medical facility handling the lien reduction request.

Figure 6:
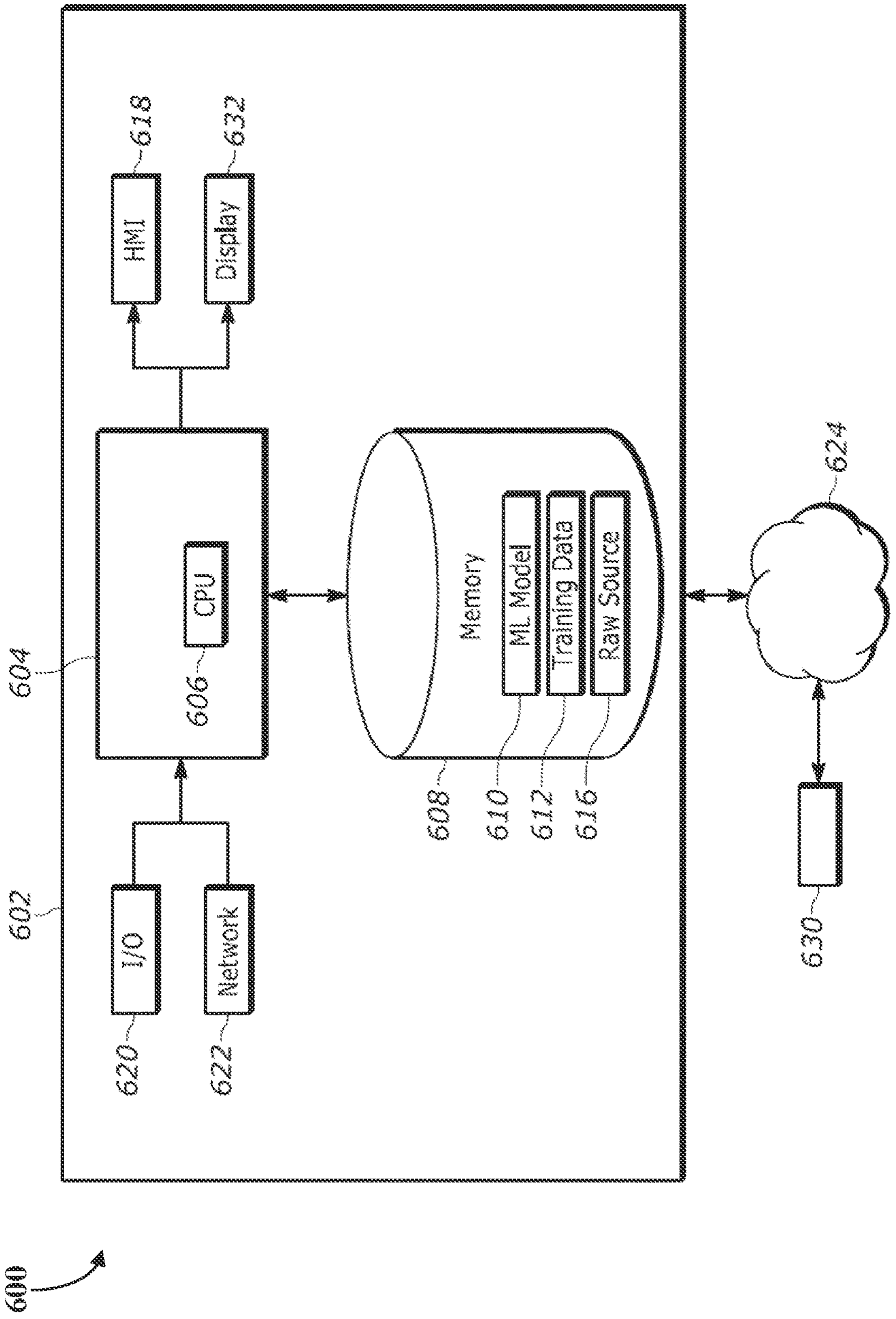
FIG. 6 is an example computing system, in accordance with the present disclosure.

FIG. 6 is an example computing system 602 in accordance with the systems and methods described herein. Any of the client device 102, legal entity device 104, remote server 106, and healthcare facility 108 may comprise one or more computing systems 602. The computing system 602 may include at least one processor 604 that is operatively connected to a memory unit 608, which is a non-transitory computer readable medium. The processor 604 may be a multicore processor having multiple processors which may operate in parallel. The processor 604 may include one or more integrated circuits that implement the functionality of a central processing unit (CPU) 606. The CPU 606 may be a commercially available processing unit that implements an instruction stet such as one of the x86, ARM, Power, or MIPS instruction set families.

During operation, the CPU 606 may execute stored program instructions that are retrieved from the memory unit 608. The stored program instructions may include software that controls operation of the CPU 606 to perform the operation described herein. In some embodiments, the processor 604 may be a system on a chip (SoC) that integrates functionality of the CPU 606, the memory unit 608, a network interface, and input/output interfaces into a single integrated device. The computing system 602 may implement an operating system for managing various aspects of the operation.

The memory unit 608 may include volatile memory and non-volatile memory for storing instructions and data. The non-volatile memory may include solid-state memories, such as NAND flash memory, magnetic and optical storage media, or any other suitable data storage device that retains data when the computing system 602 is deactivated or loses electrical power. The volatile memory may include static and dynamic random-access memory (RAM) that stores program instructions and data. For example, the memory unit 608 may store a machine-learning model 610 or algorithm, a training dataset 612 for the machine-learning model 610, raw source dataset 616.

The computing system 602 may include a network interface device 622 that is configured to provide communication with external systems and devices. For example, the network interface device 622 may include a wired and/or wireless Ethernet interface as defined by Institute of Electrical and Electronics Engineers (IEEE) 802.11 family of standards. The network interface device 622 may include a cellular communication interface for communicating with a cellular network (e.g., 3G, 4G, 5G). The network interface device 622 may be further configured to provide a communication interface to an external network 624 or cloud.

The external network 624 may be referred to as the world-wide web or the Internet. The external network 624 may establish a standard communication protocol between computing devices. The external network 624 may allow information and data to be easily exchanged between computing devices and networks. One or more servers 630 may be in communication with the external network 624.

The computing system 602 may include an input/output (I/O) interface 620 that may be configured to provide digital and/or analog inputs and outputs. The I/O interface 620 may include additional serial interfaces for communicating with external devices (e.g., Universal Serial Bus (USB) interface).

The computing system 602 may include a human-machine interface (HMI) device 618 that may include any device that enables the system 600 to receive control input. Examples of input devices may include human interface inputs such as keyboards, mice, touchscreens, voice input devices, and other similar devices. The computing system 602 may include a display device 632. The computing system 602 may include hardware and software for outputting graphics and text information to the display device 632. The display device 632 may include an electronic display screen, projector, printer or other suitable device for displaying information to a user or operator. The computing system 602 may be further configured to allow interaction with remote HMI and remote display devices via the network interface device 622.

The system 600 may be implemented using one or multiple computing systems. While the example depicts a single computing system 602 that implements all of the described features, it is intended that various features and functions may be separated and implemented by multiple computing units in communication with one another. The particular system architecture selected may depend on a variety of factors. In some embodiments, the system 600 may be configured to perform the systems and methods described herein, using the system 600 and/or various classical computing algorithms.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in that particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or later, or intervening element or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to described various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for automating processing of a medical lien request, the method comprising:

establishing, by a healthcare facility computing system, an authenticated application programming interface (API) session with a legal entity device of a legal entity by distributing a data object that installs an API and using at least one device property of the legal entity device to authenticate a network connection;

receiving, by the healthcare facility computing system and via the authenticated API session over a network, from the legal entity device, a request to decrease a lien amount associated with a patient;

calculating, by the healthcare facility computing system, by accessing a legal database and a medical billing database of the healthcare facility, and based on one or more resolved lien reductions associated with the legal entity, a predicted lien resolution dataset;

wherein the calculating comprises generating, by a trained machine learning model stored in a memory of the healthcare facility computing system, a plurality of counter-offer lien reduction amounts each with an associated confidence score;

presenting, by a lien resolution user interface of the healthcare facility computing system, the predicted lien resolution dataset including the plurality of counter-offer lien reduction amounts and the associated confidence scores;

sending, by the healthcare facility computing system, to another computer via the authenticated API session over the network, a lien resolution response based on a selected counter-offer lien reduction amount from the predicted lien resolution dataset; and receiving, by the healthcare facility computing system and via the authenticated API session over the network, an answer to the lien resolution response.

2. The method of claim 1, further comprising: automatically updating, in response to the lien resolution response, a record in a medical billing database storing the lien amount associated with the patient.

3. The method of claim 1, wherein the request to decrease the lien amount for the patient includes a requested lien reduction amount; and wherein the lien resolution response includes at least one of an approval of the requested lien reduction amount or a counter-offer amount.

4. The method of claim 3, wherein the lien resolution response includes the counter-offer amount, and wherein the answer to the lien resolution response includes an acceptance of the counter-offer amount.

5. The method of claim 3, wherein the lien resolution response includes the counter-offer amount, and the answer to the lien resolution response includes a rejection of the counter-offer amount, and the method further includes:

updating, based on the rejection of the counter-offer amount, training data for the trained machine learning model and updating one or more model parameters; generating, by the trained machine learning model, an updated predicted lien resolution dataset comprising a ranked set of counter-offer amounts each with an associated confidence score; and sending, by the healthcare facility computing system, to another computer via the authenticated API session over the network, a second lien resolution response based on the updated predicted lien resolution dataset.

6. The method of claim 4, further comprising: automatically updating, in response to the acceptance of the counter-offer amount, a record in a medical billing database storing the lien amount associated with the patient.

7. The method of claim 1, further comprising:

training, based on one or more records of resolved lien reduction requests, a machine learning model; and wherein calculating the predicted lien resolution dataset includes generating, by the machine learning model, the predicted lien resolution dataset.

8. The method of claim 1, wherein the predicted lien resolution dataset is calculated based on resolved lien reduction data from a network of medical entities.

9. The method of claim 1, wherein receiving the request to decrease the lien amount for the patient further includes receiving a legal document.

10. The method of claim 9, wherein the legal document is one of: a judgement, a subpoena, a settlement agreement, or an arbitration agreement.

11. The method of claim 1, further comprising:

presenting, by a lien reduction user interface of the legal entity device, a form for accepting information related to the request to decrease the lien amount for the patient;

receiving, by the lien reduction user interface of the legal entity device, input data regarding the request to decrease the lien amount;

generating, using the input data, the request to decrease the lien amount; and sending, to the healthcare facility computing system via the authenticated API session over the network, the request to decrease the lien amount.

12. The method of claim 7, wherein the machine learning model weights more heavily data associated with resolved lien reduction requests that are more recent and from the legal entity.

13. The method of claim 1, further comprising:

automatically updating, by the healthcare facility computing system, and in response to the answer indicating an acceptance of the selected counter-offer lien reduction amount, a record in the medical billing database storing the lien amount associated with the patient and recording the acceptance in the legal database.

14. The method of claim 1, further comprising:

calculating, by accessing the legal database and the medical billing database, and in response to the answer indicating a rejection of the selected counter-offer lien reduction amount, an updated predicted lien resolution dataset and sending, by the healthcare facility computing system via the authenticated API session, a second lien resolution response based on the updated predicted lien resolution dataset.

* * * * *